(12) United States Patent
Perrow

(10) Patent No.: US 6,390,926 B1
(45) Date of Patent: May 21, 2002

(54) RETAINER ASSEMBLY FOR TRIPOT JOINT

(75) Inventor: Scott Jay Perrow, Freeland, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/707,108

(22) Filed: Nov. 6, 2000

(51) Int. Cl.$^7$ ................................. F16D 3/30
(52) U.S. Cl. ................ 464/111; 464/905; 464/124
(58) Field of Search ..................... 464/111, 112, 464/120, 122, 123, 124, 113, 115, 121, 905

(56) References Cited

U.S. PATENT DOCUMENTS

| | | | |
|---|---|---|---|
| 3,875,762 A | * 4/1975 | Tampalini | 384/495 |
| 3,922,011 A | 11/1975 | Walters | |
| 4,083,202 A | * 4/1978 | Westercamp | 464/111 |
| 4,437,219 A | 3/1984 | Dore | |
| 4,516,957 A | 5/1985 | Chyz et al. | |
| 4,605,384 A | * 8/1986 | Kurzeja et al. | 464/111 |
| 5,632,682 A | * 5/1997 | Krude et al. | 464/111 |
| 5,643,092 A | 7/1997 | Girguis | |
| 6,190,260 B1 | * 2/2001 | Flores et al. | 464/111 |
| 6,251,019 B1 | * 6/2001 | Hofmann et al. | 464/111 |

* cited by examiner

Primary Examiner—Lynne H. Browne
Assistant Examiner—Kenn Thompson
(74) Attorney, Agent, or Firm—Edmund P. Anderson

(57) ABSTRACT

A retainer system for use in a tripot type universal joint is provided. The universal joint includes a spider having a plurality of rollers thereon. The rollers travel in drive channels within a housing of the joint. The retainer system comprises a retaining ring, having generally planar small diameter segments and generally planar and axially offset large diameter segments. The small diameter and large diameter segments are connected by blocking segments. The retainer system also comprises an annular groove having a retaining ring movement portion. The retaining ring movement portion allows for movement of the small diameter segments and blocking segments between an uncompressed state and a compressed state. In the compressed state, the spider can be inserted into the housing, because the blocking segments move out of the drive channels. In the uncompressed state, the blocking segments obstruct the drive channels to prevent movement of the rollers therepast outwardly of the housing to thereby maintain the spider in the housing. A method of assembling a universal joint is also provided.

9 Claims, 5 Drawing Sheets

RETAINER ASSEMBLY FOR TRIPOT JOINT

TECHNICAL FIELD

The present invention relates to a retainer assembly for use with a stroking universal joint and method for retaining a stroking universal joint.

More specifically, the present invention relates to a novel retaining ring and groove assembly used to retain a spider assembly within a housing in a tripot type universal joint.

BACKGROUND OF THE INVENTION

Stroking universal joints for use in connection with constant velocity joints are well known in the art. One such type of stroking joint is a tripot type. Very generally, a tripot type universal joint includes a housing defining a plurality of elongated drive channels and a spider assembly retained within the housing. The spider assembly includes rollers disposed in the drive channels for allowing relative longitudinal movement between the spiders and the housing. A splined shaft is typically connected to an interior hub in the spider assembly. Similarly, a splined shaft is connected to the housing. Relative rotational movement is transmitted between the splined shafts through the spider and housing assembly. The spider assembly allows for relative longitudinal movement between the two splined shafts. This axial movement or stroke is required for changes in distance during normal suspension movement.

The tripot type joint requires the aid of some type of retention method to retain the spider assembly within the tripot housing. Known retention methods include the use of a wire ring, staking of the drive channels to prevent the spider assembly moving therepast or a stamping. All of these methods require assembly after the spider is inserted into the housing during final assembly of the constant velocity joint. Such assembly processes are relatively more complex, therefore, adding time and effort to the assembly process.

One such wire ring is shown in U.S. Pat. No. 4,516,957 to Chyz, et al. Another such retainer is shown in U.S. Pat. No. 4,437,219 to Dore.

SUMMARY OF THE INVENTION

According to the present invention, there is provided a retainer assembly for use in a stroking universal joint of the type having an inner drive spider assembly with a plurality of circumferentially spaced trunnions, an outer drive housing member having an interior wall surrounding the spider assembly. A plurality of elongated drive channels is in the interior wall of the housing wall member. Each of the trunnions has a drive roller rotatably mounted thereon and respectively disposed for linear travel in an associate one of the drive channels. The retainer assembly comprises a retaining ring adapted to be mounted in the other drive assembly for movement between compressed and uncompressed states to retain the inner drive spider assembly therein when in the uncompressed state. The retaining ring has first generally planar small diameter segments and second generally planar large diameter segments. The first small diameter segments are axially offset from the large diameter segments. The first diameter segments and the second diameter segments are connected by blocking segments. The assembly further comprises an annular groove in the interior wall of the housing member. The annular groove includes a deep groove portion and at least one retaining ring movement portion for allowing movement of the retaining ring therein.

A method for retaining a stroking universal joint of the type having an inner drive spider with a plurality of circumferentially spaced trunnions and an outer drive housing member having an inner wall surrounding the spider assembly is also provided. The spider assembly used in the method has a plurality of elongated drive channels in the interior wall of the housing. Each of the trunnions has a drive roller rotatably mounted thereon. The method comprises the steps of providing the housing member with an annular groove in the interior wall thereof. The annular groove includes at least one retaining ring movement portion for allowing movement of a retaining ring therein. The method further comprises inserting a retaining ring, having first generally planar small diameter segments and second generally planar large diameter segments, the first small diameter and second large diameter segments being axially offset from each other and connected by blocking segments, into the annular groove, such that at least a portion of the blocking segments lies within the drive channel in an uncompressed state. The spider assembly is further inserted into the housing by placing the rollers into the drive channels. A force is applied to the spider assembly sufficient to move the retaining ring to a compressed state wherein the blocking segments move out of the drive channels. The spider assembly is further inserted into the housing past the retaining ring until the retaining ring returns to the uncompressed state.

Accordingly, it is an object of the present invention to provide a pre-assembled retaining ring within the housing before assembly of the spider with the housing which pre-assembled retaining ring allows the spider assembly to be inserted into the housing and then retained therein by the retaining ring.

It is another object of the present invention to provide a retainer that is moved in response to an insertion force supplied by the spider to the ring allowing movement of the retaining ring in a groove and providing a ring that locks in position once the spider assembly has been sufficiently moved into the housing.

It is another object of the present invention to provide a specific grooved geometry that allows movement of the retaining ring during insertion of the spider assembly but prevents movement of the retaining ring once the spider assembly has been moved into the housing.

It is another object of the present invention to provide a pre-assembled retainer system that does not require any further fabrication once the spider assembly is moved to within the housing.

It is another object of the present invention to provide a wire retainer assembly within the end of the housing to retain the spider assembly therein which does not substantially add to the bulk or weight of the joint and which can be easily and repeatedly removed and reinstalled.

Another object of the present invention is to provide a new and improved retainer assembly for use in a tripot joint for retaining the spider assembly and which has a retaining ring fit within a groove in the housing which is adapted to stop the rollers at their full out position without detracting from effective and efficient operation of the spider during drive transmission.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE DRAWINGS

Figures 1, 2:
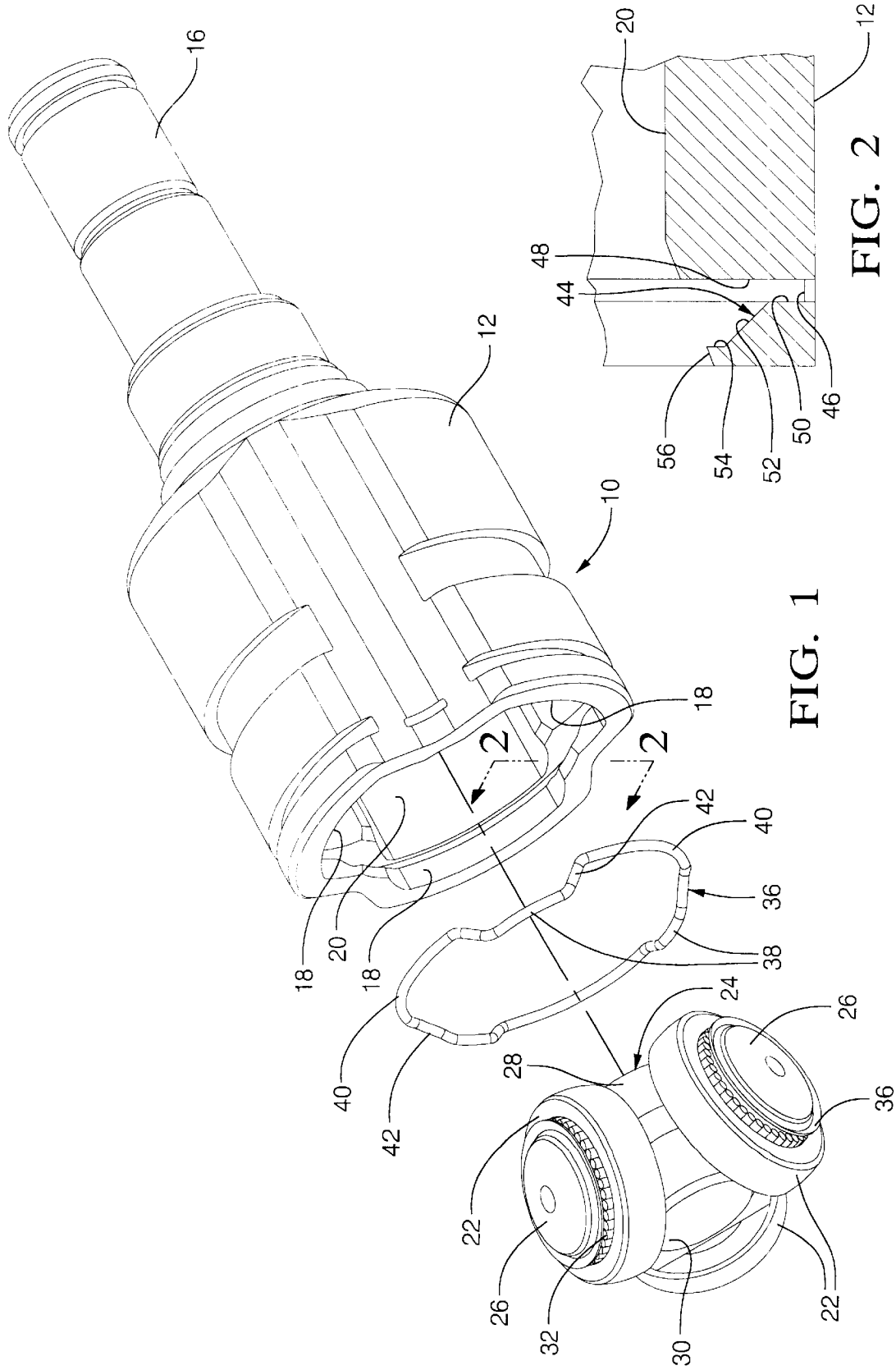
FIG. 1 is an exploded view of a universal joint assembly showing one embodiment of the preferred retainer assembly.
FIG. 2 is a cross-sectional view partially broken away showing the groove of the preferred retainer assembly.

FIG. 1 shows generally at 10 a universal joint of the tripot type. The tripot joint 10 includes a generally cylindrical housing 12. The housing 12 is closed at an inboard end by an end wall 14. The joint 10 includes a drive shaft 16 integral with the end wall 14 that extends axially therefrom. The drive shaft 16 is preferably splined.

The housing 12 is open at its outer end and has three equally circumferentially spaced and longitudinally extending drive channels 18 formed in the interior wall of the housing 12. The drive channels 18 are concentric about the longitudinal axis A of the housing 12 and the drive shaft 16. Each of the longitudinally extending channels 18 is bounded by concave side walls 20 which form part of the tracks or guides that engage the curved surfaces of associated drive rollers 22 of a spider assembly, generally indicated at 24.

The spider assembly 24 includes a hub 28 and three trunnions 26 extending radially from the hub 28. The hub 28 includes a central bore 30. The central bore 30 is splined for receiving a splined shaft (not shown) in any well-known manner. Preferably, the splined shaft is fixed within the central bore 30 and is for transmitting rotational movement between the shaft and the hub 28.

Each of the drive rollers 22 is mounted on a trunnion 26 extending from the hub 28. Preferably, the rollers 22 are mounted on the trunnions 26 with a full complement of needle bearings 32 interposed between the inner diameter of the roller 22 and the outer cylindrical surface of the associated trunnion 26. Annular retainers 34 are secured to the outer end of each trunnion 26 to retain the needle bearings 32 in location and limit the radial outward movement of the associated roller 22 on the trunnion 26. The drive rollers 22 are thus rotatable on the trunnions 26 and thereby allow axial movement of the spider 24 in the housing 12 to allow the universal stroking and pivotal movement of the joint. With the above described assembly, each drive roller 22 is captured in the radial direction in its associated drive channel and is maintained substantially equidistant from the longitudinal axis A during joint operation.

While drive rollers 22 and needle bearings 32 are disclosed, it will be appreciated that any roller style may be used in accordance with the present invention.

To maintain the spider assembly 24 within the housing 12, a novel retainer assembly is used. Generally, the retainer assembly comprises a specifically configured retaining ring 36 and groove 44. The retaining ring comprising a spring retainer, generally indicated at 36. The retaining ring 36 is formed from spring wire configured into a generally hoop shape configuration preferably with the free ends butt welded or otherwise secured together. The retaining ring 36 is adapted to be mounted in a groove generally indicated at 44 in the housing 12 for movement between compressed and uncompressed states to retain the spider assembly 24 in the housing 12 when the retaining ring 36 in the uncompressed state.

Figure 3:
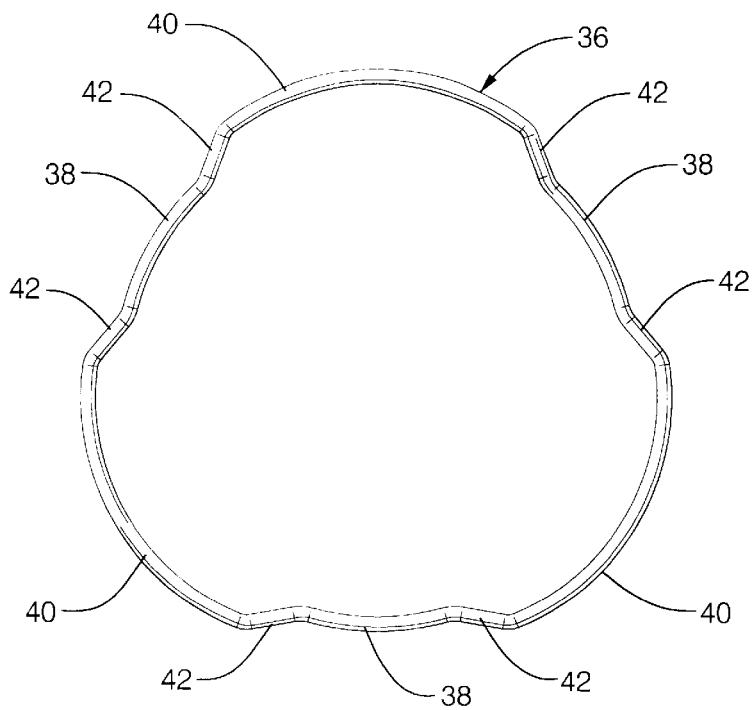
FIG. 3 is a front elevational view of the retaining ring in accordance with preferred embodiment of the present invention.
Figure 4:
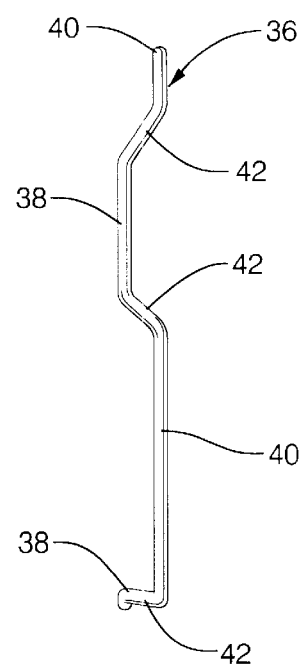
FIG. 4 is a side elevational view of the retaining ring in accordance with preferred embodiment of the present invention.

The retaining ring 36 has first small diameter segments 38. Each of the small diameter segments 38 lies generally in the same plane. The retaining ring 36 also includes second large diameter segments 40. The large diameter segments 40 also lie generally in the same plane. The first small diameter 38 segments are axially offset from the large diameter segments 40. That is, the first small diameter segments 38 and second large diameter segments 40 are each concentric about a longitudinal axis B (as shown in FIG. 3). When the retaining ring 36 is disposed within the housing 12, the axis B coincides with the axis A of the housing 12. As best seen in FIG. 4, the first segments 38 lie in a plane that is offset, along the axis B, from the plane in which the second segments 40 lie.

As best seen in FIG. 3, the large diameter segments 40 are spaced a greater radial distance from the axis B than are the small diameter segments 38. The small diameter segments 38 and the large diameter segments 40 are connected by blocking segments 42. In all, the retaining ring 36 comprises three large diameter segments 40, three small diameter segments 38 and six blocking segments 42, interconnecting the large diameter segments 40 and small diameter segments 38. Thus, the retaining ring 36 has a trilobal shape with its inner diameter being axially offset from its outer diameter. This configuration allows the retaining ring 36 to act like a spring in moving between the compressed and uncompressed states, as set forth in more detail below.

The groove 44 is for receiving and retaining the retaining ring 36. The groove 44 comprises a specific geometry that allows the retaining ring 36 to move or collapse in one direction, to allow insertion of the spider 24 into the housing 12. The groove geometry also allows the retaining ring 36 to maintain its shape if a force is applied to it in the other direction to prevent removal of the spider 24 from the housing 12.

Figure 9:
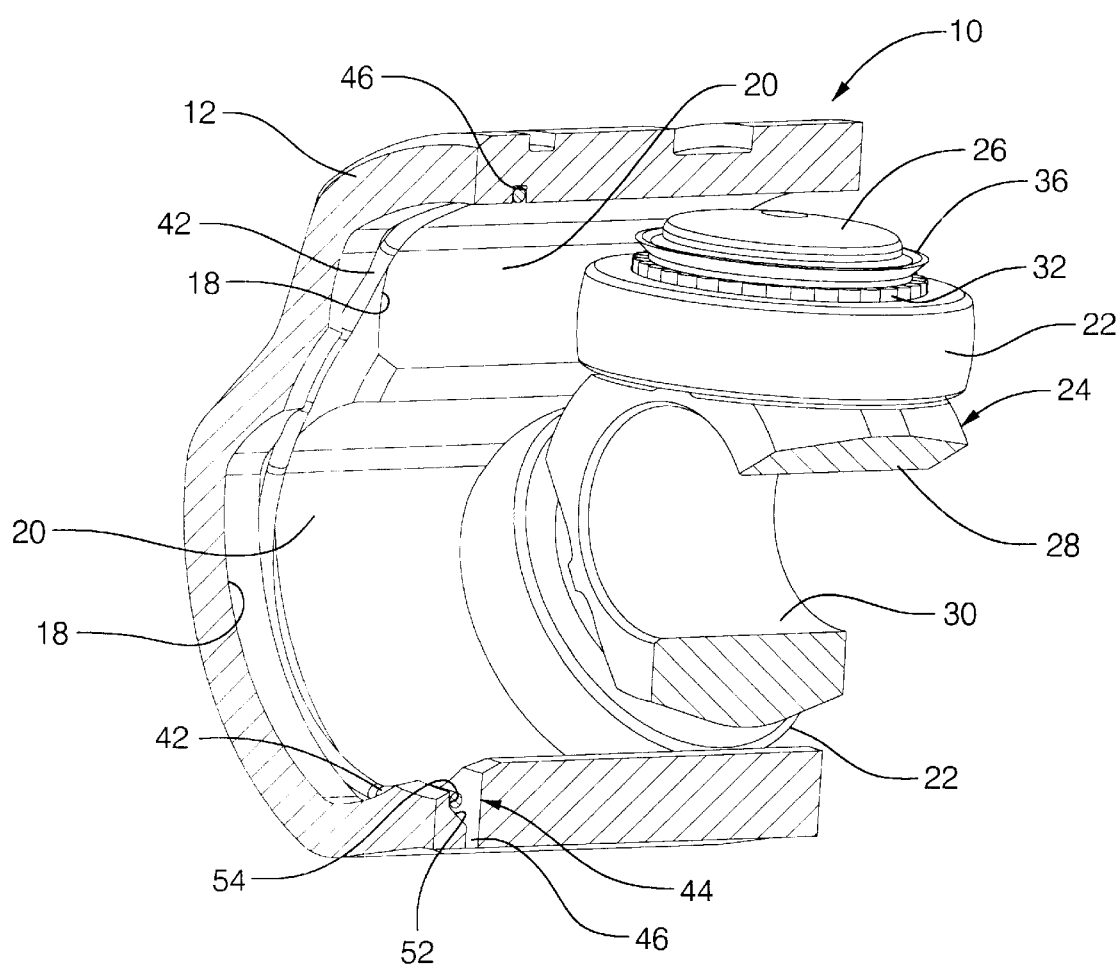
FIG. 9 is a cross-sectional view partially broken away showing the spider assembly inserted within the housing.

The groove 44 geometry can best be seen in FIGS. 2 and 9. As shown, the groove comprises an annular deep groove portion 46. This deep groove portion 46 has a back stop wall 48 extending from the interior side wall 20. The deep groove portion also has a forward wall 50. This deep groove area extends about the entire inner periphery of the side walls 20 within the housing 12.

The groove 44 also includes at least one retaining ring movement portion. In the preferred embodiment, the groove includes three retaining ring movement portions in the areas where the side walls 20 converge, as best seen in FIG. 9. The side walls 20 include only the deep groove portion 46 in the areas spaced from the where they converge, as best seen in FIGS. 1 and 6.

The specific geometry of the retaining ring movement portion is best illustrated in FIG. 2. The retaining ring movement portion comprises an angled wall 52 extending axially outwardly of said housing 12 and radially inwardly from the forward wall 50 of the deep groove portion 46. The retaining ring movement portion further comprises a front stop wall 54. The front stop wall extends radially inwardly from the angled wall 50.

The housing 12 further includes a cam surface 56 in the interior wall thereof. The cam surface 56 leads directly into the groove 44 and aids in the insertion of the retaining ring 36 into the groove 44.

Figure 5:
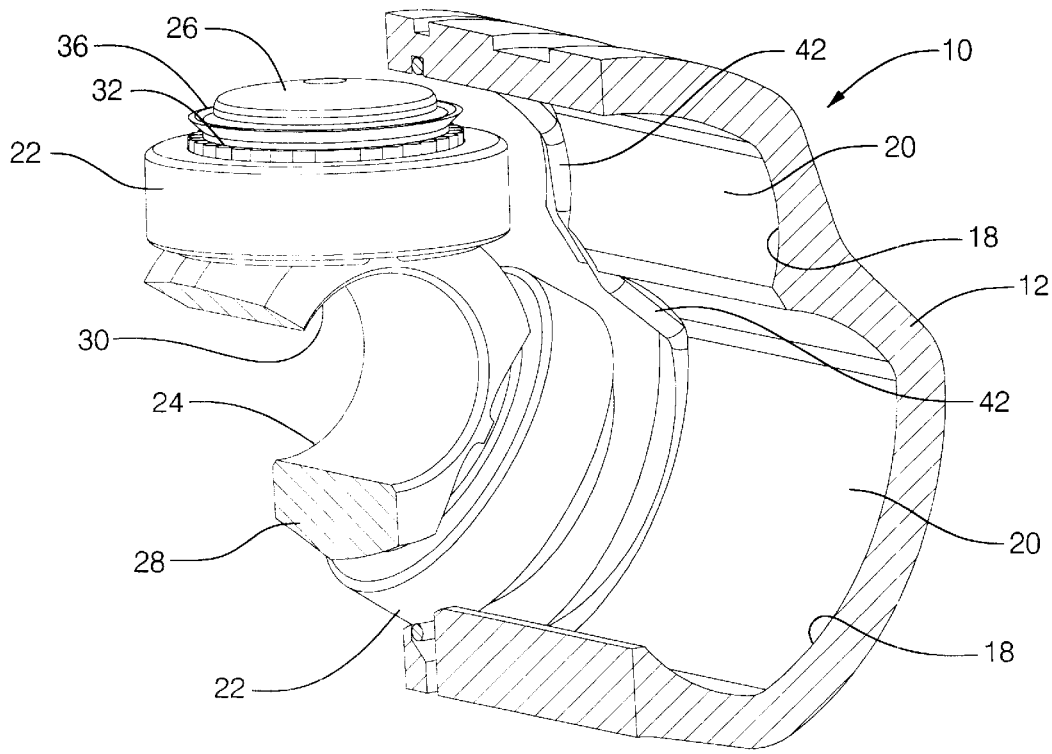
FIG. 5 is a cross-sectional view partially broken away showing the spider assembly prior to insertion into the housing.
Figure 6:
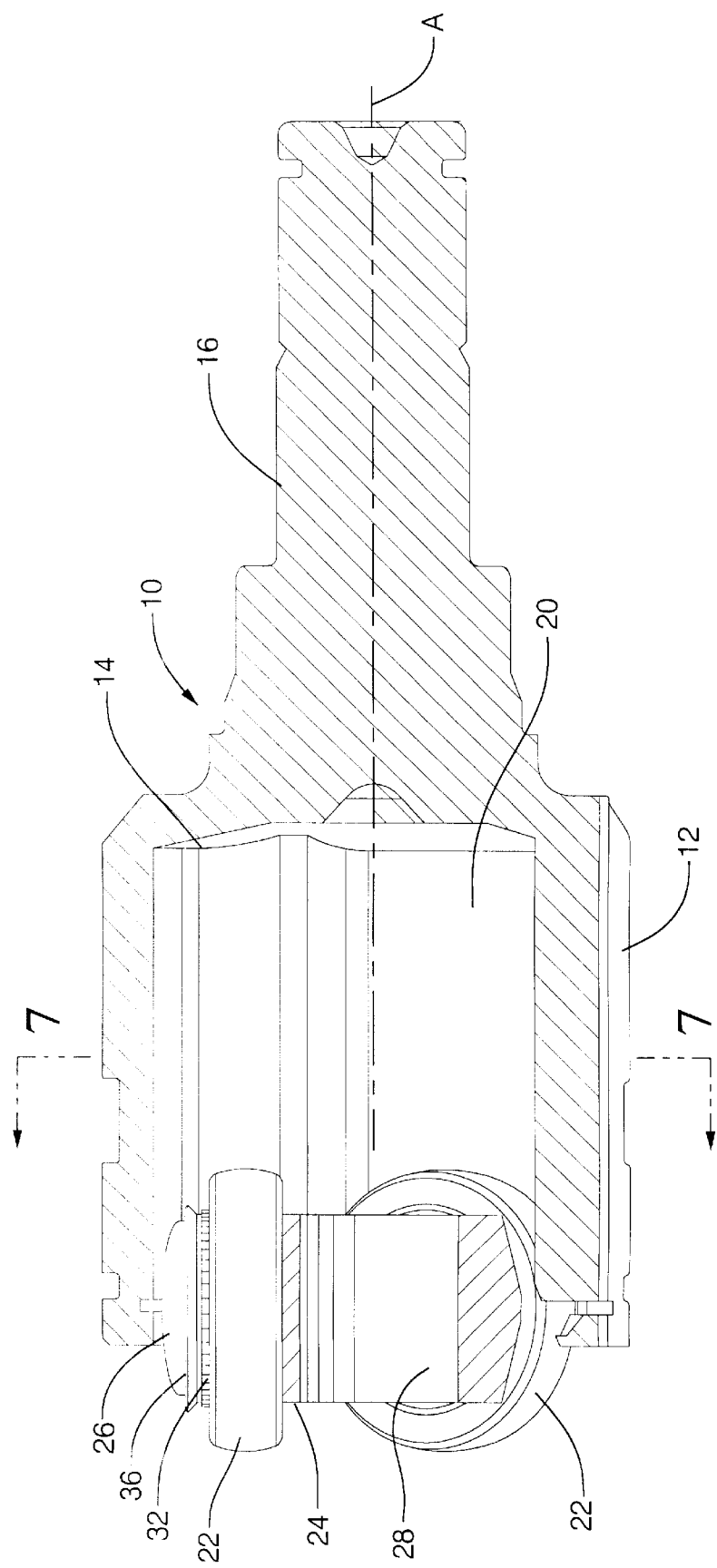
FIG. 6 is a cross-sectional view showing the spider assembly being inserted into the housing.
Figure 7:
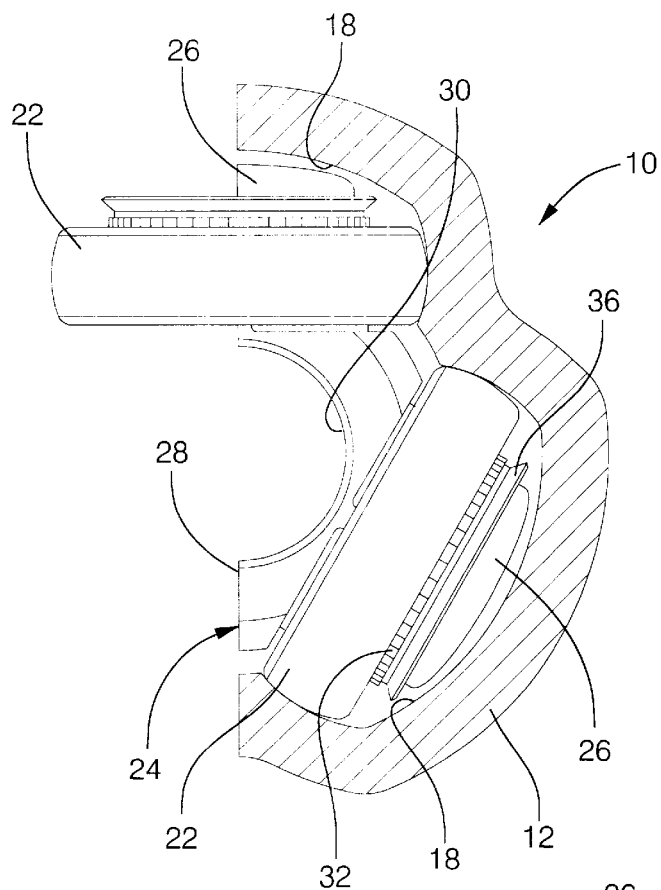
FIG. 7 is an end view partially broken away showing the spider assembly being inserted into the housing.

The retaining ring 36 is designed to be disposed in the groove 44 to move between an uncompressed state, FIGS. 5 and 9, and a compressed state, FIGS. 6 and 7. When the retaining ring 36 is initially inserted into the groove 44, it is in the uncompressed state. In this state, the large diameter segments 40 lie in the deep groove portion 46 in the side walls 20. The small diameter segments 38 are in the retaining ring movement portion of the groove 44 and abut the front stop wall 54. The blocking segments 42 extend out of the groove 44 and into the drive channels 18.

Figure 8:
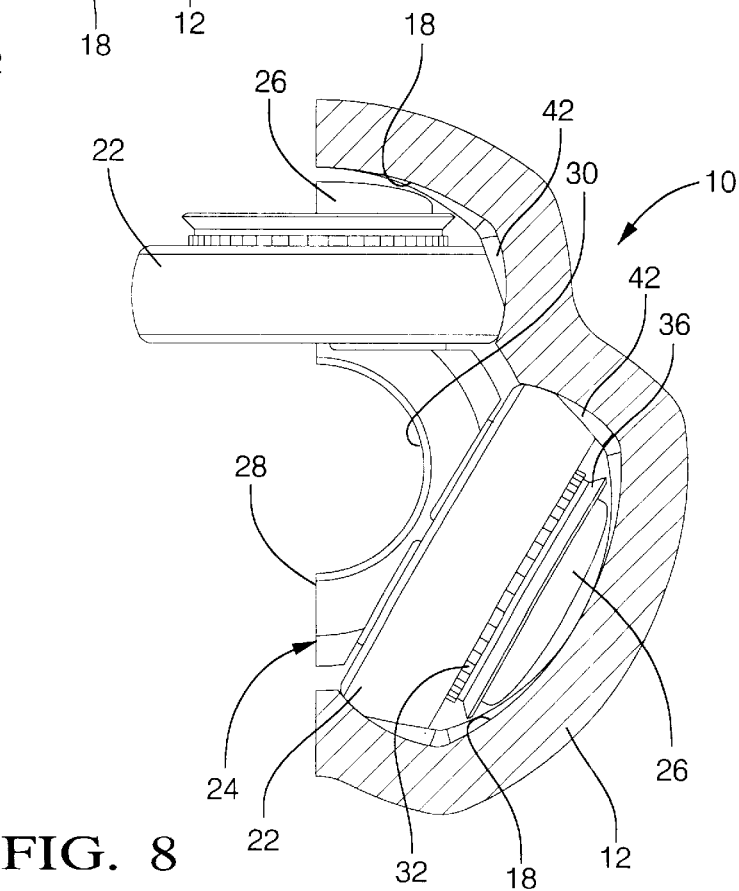
FIG. 8 is an end view partially broken away showing the spider assembly just inserted within the housing.

As is shown in FIG. 8, these six blocking segments 42 extend outward of a groove 44 in the side walls 20 when the retaining ring 36 is disposed in the groove 44 and the retaining ring 36 is in the uncompressed state. In this position, the blocking segments 42 effectively restrict the width of each channel 18 to prevent the removal of the spider assembly 24 from the housing 12 by physically obstructing outward movement of the drive rollers 22.

When in the compressed state, the large diameter segments 40 do not move and remain in the deep groove portion 46 in the side walls 20. The small diameter segments 38 move or collapse into the deep groove portion 46, FIG. 6. This causes the blocking segments 42 to move into the groove 44 and out of the drive channels 18. In the compressed state, the spider assembly 24 can be inserted into the housing 12.

Movement of the retaining ring 36 between the compressed state and the uncompressed state is now describe in connection with the method of assembly of the tripot joint 10. To assemble the joint 10, the retaining ring 36 is first placed in the groove 44. In inserting the ring 36 into the groove, the cam surface 56 engages the ring 36 and helps deflect the ring 36 so it can be inserted into the groove 44.

The ring 36 is inserted into the groove 44 such that the large segments 40 are located in the deep groove portion 46 in the area of the side walls 20 remote from the converging ends thereof. The small segments 38 are positioned in the groove 44 such that they engage the front stop wall 54 of the groove 44. The blocking segments 42 extend outwardly of the groove 44 and into the drive channel 18. After the retaining ring 36 is inserted into the groove, it is in the uncompressed state. This uncompressed state is best seen in FIGS. 8 and 9.

The spider 24 is then inserted into the housing 12. More specifically, each of the rollers 22 is inserted into an associate drive channel 18. This is shown in FIG. 5. The spider 24 is inserted until the drive rollers 22 engage the blocking segments 42. An additional force is then applied to the spider 24, causing the rollers 22 to press against the blocking segments 42, causing the small diameter segments 38 to collapse down the angled wall 52 and into the deep groove area 46, as shown in FIG. 6. The rearward axial movement of the ring 36 is limited by the back stop wall 48.

This collapsing of the small diameter segments 38 causes movement of the blocking segments 42 into the deep groove area 46 and out of the drive channels 18. This is the compressed state of the retaining ring 36 and is best seen in FIGS. 6 and 7. In this compressed state, the rollers 22 are free to move past the retaining ring 36 within the drive channels 18, thereby allowing the spider 24 to be inserted into the housing 12.

Once the rollers 22 have passed over the retaining ring 36, the spring action of the retaining ring 36 moves it back to the original uncompressed state. This is best seen in FIGS. 8 and 9. In this position, the blocking segments 42 again extend into the drive channels 18.

When the spider 24 is fully inserted into the housing 12, the blocking segments 42 restrict the width of the channels 18 to prevent the removal of the spider 24 by physically blocking the channels 18. If a force is applied to the spider in a manner to attempt to remove it from the housing 12, the rollers 22 engage the blocking segments 42. But, the small diameter segments 38 engage the front stop wall 54 which prevents forward axial movement of the retaining ring 36. The retaining ring 36 thus cannot move in the outward axial direction. Because the retaining ring 36 cannot move in the forward axial direction, the blocking segments 42 effectively preclude further forward movement of the rollers 22 and therefore the spider 24.

Once the spider 24 is inserted into the housing 12, the retaining ring 36 allows for full axial stroking movement of the joint 10. The retaining ring 36 and groove 44 also allow for full angular deflection of the spider 24 within the housing. Thus, the retaining ring 36 and groove 44 do not interfere with normal operation of the joint. The retaining ring 36 and groove 44 also allow for a system where the retaining ring 36 can be assembled into the groove 44 prior to the time the spider 24 is inserted into the housing 12. This facilitates assembly of the universal joint 10.

The retaining ring 36 can be removed from the groove 44 to allow maintenance on the joint 10. This can be accomplished by applying a prying tool between the blocking segments 44 and the housing wall 20. A force can be applied to dislodge the retaining ring 36 from the groove to remove it from the housing. With the retaining ring 36 removed, the joint 10 can be serviced. To reassemble the joint 10, the retaining ring 36 is reinserted into the groove 44 as describe above. The spider 24 is then reinserted into the housing as set forth above.

The invention is described in an illustrative manner, and it is to be understood that the terminology which has been used is intended to be in the nature of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A retainer assembly for use in a stroking universal joint of the type having an inner drive spider assembly with a plurality of circumferentially spaced trunnions and an outer drive housing member having an interior wall surrounding said spider assembly, a plurality of elongated drive channels in said interior wall of said housing member, each of said trunnions having a drive roller rotatably mounted thereon and respectively disposed for linear travel in an associate one of said drive channels, said retainer assembly comprising a retaining ring adapted to be mounted in said housing for movement between compressed and uncompressed states to retain said inner drive spider assembly therein when in said uncompressed state, said retaining ring having first generally planar small diameter segments and second generally planar large diameter segments, said first small diameter segments being axially offset from said large diameter segments, said first diameter segments and said second diameter segments being connected by blocking segments; and an annular groove in said interior wall of said housing member, said annular groove including a deep groove portion and at least one retaining ring movement portion for allowing movement of said retaining ring therein.

2. A retainer assembly as set forth in claim 1 wherein said retaining ring movement portion comprises an angled wall extending axially outwardly and radially inwardly from said groove and a front stop wall extending radially inwardly from said angled wall.

3. A retainer assembly as set forth in claim 2 wherein said small diameter segments engage said front stop wall to prevent axial movement of said retaining ring out of said housing when in said uncompressed state.

4. A retainer assembly as set forth in claim 1 wherein said annular groove has a back wall extending from said interior wall of said housing, said back wall limiting axial movement of said retaining ring into said housing.

5. A retainer assembly as set forth in claim 4 wherein said blocking segments extend into said drive channels when said retaining ring is in said uncompressed state to prevent said spider assembly from being removed from said housing.

6. A retainer assembly as set forth in claim 5 wherein said blocking segment is moved into said groove and out of said drive channel when said retaining ring is in said compressed state to allow for insertion of said spider into said housing.

7. A retainer assembly as set forth in claim 6 wherein said small diameter segment is moved into said groove and out of contact with said flat wall when said retaining ring is in said compressed state to allow for insertion of said spider into said housing.

8. A retainer assembly as set forth in claim 5 wherein said interior wall has at least one cam surface to cam the retaining ring inwardly to thereby allow insertion of said retaining ring into said annular groove.

9. A method of retaining a stroking universal joint of the type having an inner drive spider assembly with a plurality of circumferentially spaced trunnions and an outer drive housing member having an interior wall surrounding the spider assembly, a plurality of elongated drive channels in the interior wall of the housing member, each of the trunnions having a drive roller rotatably mounted thereon, comprising the steps of:

providing the housing member with an annular groove in the interior wall thereof, the annular groove including at least one retaining ring movement portion for allowing movement of a retaining ring therein;

inserting a retaining ring having first generally planar small diameter segments and second generally planar large diameter segments, the first small diameter and second large diameter segments being axially offset from each other and connected by blocking segments into the annular groove such that at least a portion of the blocking segments lies within the drive channel in an uncompressed state;

inserting the spider assembly into the housing by placing the rollers into the drive channels;

applying a force to the spider assembly sufficient to move the retaining ring to a compressed state wherein the blocking segments move out of the drive channels; and further inserting the spider assembly past the retaining ring until the retaining ring returns to the uncompressed state.

\* \* \* \* \*